United States Patent Office 2,756,194
Patented July 24, 1956

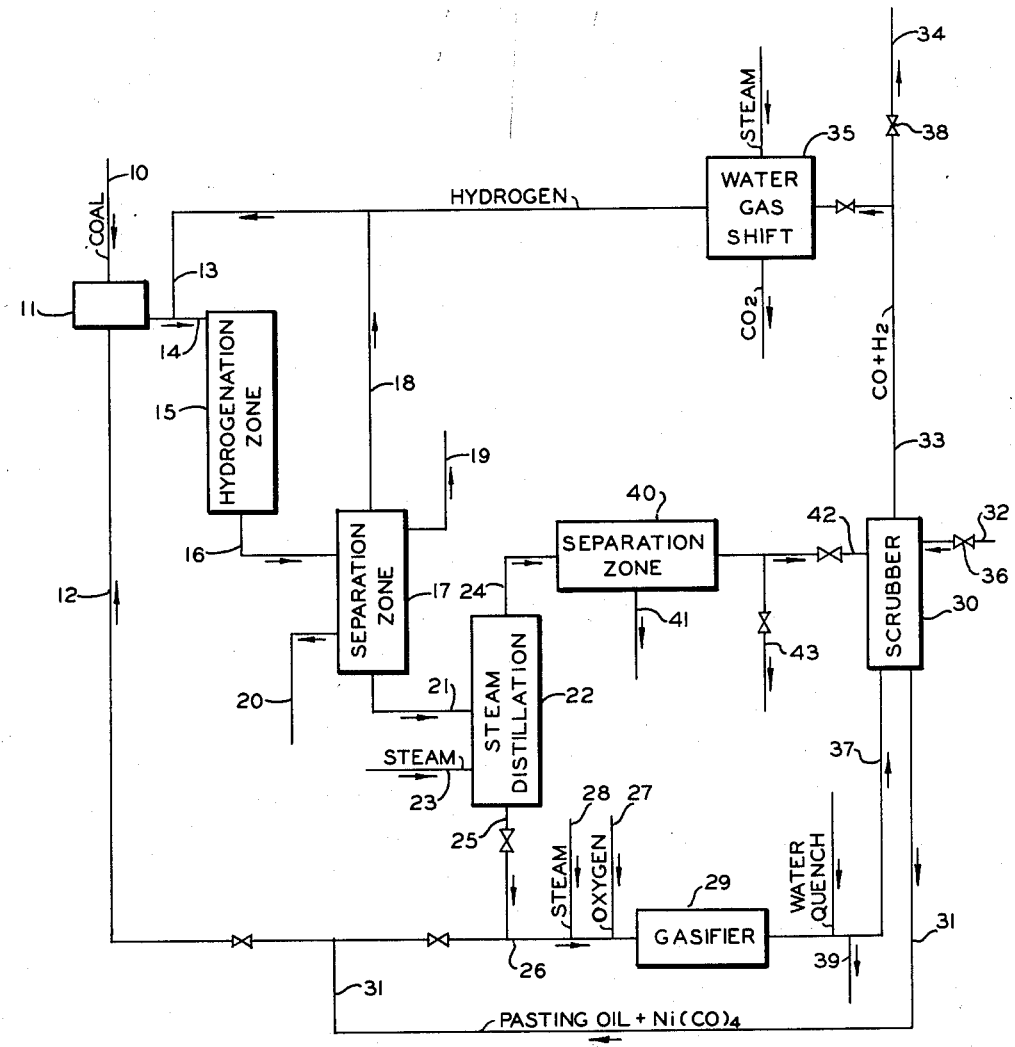

2,756,194

PROCESS USING NICKEL CARBONYL IN HYDROGENATION, DESULFURIZATION, AND GASIFICATION OF CARBONACEOUS MATERIALS

Bertrand J. Mayland, Bartlesville, Okla., assignor to Phillips Petroleum Company, a corporation of Delaware Application May 7, 1951, Serial No. 224,917

17 Claims. (Cl. 196—53)

This invention relates to an improved process for making synthesis gas or fuel gas by gasification of carbon-containing materials. In one aspect this invention relates to an improved process for making fuel gas or synthesis gas from high sulfur carbon-containing material wherein the sulfur content is reduced, by mild hydrogenation. In another aspect this invention relates to an improved process for liquefying coal or upgrading residuum by hydrogenation with the hydrogen being prepared by gasification of the residuum. In still another aspect this invention relates to a novel method for using and recovering a catalyst in the conversion of carbonaceous materials into gases.

In the conversion of carbon-containing materials into gases, a high temperature, long contact time or a catalyst are required. The first requires an excess of oxygen and results in loss of carbon in the feed to carbon dioxide and the second requires excessive reactor size. The present invention involves the use of nickel carbonyl as a catalyst to reduce the residual hydrocarbon to an equilibrium value.

In this invention, oil containing dissolved nickel carbonyl is sprayed into a combustion chamber together with steam and oxygen. At the temperature of combustion the nickel carbonyl is decomposed to elemental nickel which is finely dispersed throughout the products of initial combustion and acts as a catalyst for reforming residual hydrocarbons. The reactions products are cooled by quenching to a point where nickel carbonyl reforms and then it is scrubbed from the gases by the fresh liquid hydrocarbon and reused.

In the hydrogen of coal, part of the pasting oil containing dissolved nickel carbonyl may be diverted to a hydrogenation step wherein a mild hydrogenation of coal or of other carbonaceous materials may be accomplished. The coal is mixed with pasting oil containing nickel carbonyl and the mixture preheated wherein the nickel carbonyl is decomposed to elemental nickel. The slurry is then contacted with hydrogen at an elevated pressure in the hydrogenation zone. A portion of the coal is liquefied and the sulfur in the coal is converted to hydrogen sulfide. The hydrogenated coal and catalyst slurry is passed to a separation zone to remove hydrogen sulfide and liquid product. The residual slurry together with nickel catalyst is taken through a gasification process as previously described.

Because the sulfur content of coals may be as high as 10 per cent by weight or more, fuel gas or synthesis gas made by conventional coal gasification processes is in many cases high in sulfur, which is undesirable for various reasons such as corrosion, catalyst poisoning, gum formation, etc. Sulfur compounds may be removed from the gas by many methods including physical absorption and chemical reaction but because of the volume of the gas stream and the presence of high carbon dioxide content, the methods are expensive.

The removal of sulfur before gasification in this invention overcomes the previous difficulties just mentioned.

Referring to the drawing a residual hydrocarbon oil is introduced through a line 32 containing valve 36 to the scrubber 30. Nickel carbonyl contained in a gas mixture formed in the process is admitted to the scrubber 30 from line 37 and is dissolved in the oil. The residual hydrocarbon oil containing usually less than 1.0 per cent by weight of nickel carbonyl based on the feed stock, and preferably between 0.1 and 0.5 per cent by weight, is passed through line 31 and line 26. This mixture is sprayed into the gasification chamber 29 together with oxygen from line 27 and steam from line 28. At the temperature of combustion the nickel carbonyl is decomposed to elemental nickel which is finely dispersed throughout the products of initial combustion and acts as a catalyst for reforming residual hydrocarbons. Typical operating conditions for the gasification process are:

|  | Broad Range | Preferred Range |
|---|---|---|
| Temperature, F | 1,400 to 3,000 | 1,800 to 2,000. |
| Pressure, atms | 1 to 20 | 2 to 7. |
| Contact time, seconds | 0.1 to 10 | 1 to 5. |

The reaction products are: methane, water, carbon dioxide, carbon monoxide and hydrogen. A typical analysis may be as follows:

|  | Mol percent |
|---|---|
| Methane | 1.0 or less |
| Water | 6 to 8 |
| Carbon dioxide | 3 to 4 |
| Carbon monoxide | 25 to 35 |
| Hydrogen | 65 to 52 |

The reaction products are cooled for example by water quenching, to a point where nickel carbonyl reforms and then it is scrubbed from the gases in the scrubber 30 by the fresh liquid hydrocarbon feed from line 32 and re-used in the gasification step by recycling through line 31. The nickel is converted to nickel carbonyl in the presence of carbon monoxide at temperatures of 200 to 300° F. in a suitable reaction chamber prior to removal of ash.

A cyclone separator (not shown) is placed in line 37 after the water quench to remove the ash through line 39.

Carbon monoxide and hydrogen-containing gas are withdrawn from the scrubber 30 through line 33 to outside utilization through line 34 containing valve 38, or a portion of this gas may be conducted to a water gas shift reaction step 35 to produce a high hydrogen content gas. The high hydrogen content gas is conducted through line 13 and line 14 to the hydrogenation step 15 to be described subsequently.

A mild hydrogenation of coal may be accomplished using nickel as a catalyst obtained by the decomposition of nickel carbonyl. The process is described with respect to coal but it can be readily modified for other carbon-containing materials such as ground oil shale, shale oil, refinery residuums, etc. In preparing the coal or other carbonaceous material for hydrogenation, it is desirable to pulverize to a relatively fine state of sub-division, preferably such that it will pass through a standard Tyler screen of about 80 mesh. The powdered coal is treated by conventional mechanical separation methods to remove inorganic sulfur. After being pulverized, the coal is conducted through feed line 10 to chamber 11. In chamber 11, the coal is admixed with a pasting oil from line 12 containing usually less than 1.0 per cent by weight of nickel carbonyl based on the carbonaceous material. This pasting oil is a recycle oil produced in the process as will be described. In general from one to three parts of pasting oil per part of coal provides a suitable fluid consistency for reaction. In general, about 0.01 to 1.0 per cent and preferably between 0.1 and 0.5 per cent by weight of the nickel catalyst based on the carbonaceous material is a sufficient amount.

The mixture of coal and pasting oil containing nickel carbonyl is pumped along with hydrogen from line 13 through line 14 and through a preheater (not shown) into the hydrogenation zone 15. Typical operating conditions for the mild hydrogenation of coal are:

|  | Broad Range | Preferred Range |
| --- | --- | --- |
| Temperature, ° F | 750 to 1,000 | 800 to 900 |
| Pressure, atmospheres | 70 to 700 | 350 to 550 |
| Contact time, hours | .25 to 8 | 1 to 3 |
| Hydrogen, cu. ft. per lb. of charge | 5 to 25 | 10 to 15 |

The nickel carbonyl is decomposed to elemental nickel in the preheater, and the elemental nickel acts as the catalyst in the hydrogenation zone 15.

The hydrogenated coal and the catalyst slurry is withdrawn from the hydrogenation zone 15, and passed through line 16 to a separation zone 17. Hydrogen-rich gas is taken off through line 18, and recycled to the hydrogenation step. Light gases and hydrogen sulfide are taken off through line 19. The gasoline fraction boiling below 400° to 430° F. is separated from the remaining heavy-oil slurry. The gasoline fraction is taken off through line 20. The heavy-oil slurry boiling above 400° to 430° F. is withdrawn from the separation zone 17 and passed through line 21 to a steam distillation unit 22, with steam being admitted through line 23. The heavy-oil slurry is steam distilled to obtain a pasting oil fraction taken off through line 24 and a residual slurry taken off through line 25. The pasting oil fraction is passed through line 24 to a separation zone 40 where water is taken off through line 41. The pasting oil is withdrawn from the separation zone 40 through line 42 and passed to a scrubber 30. Excess pasting oil not required for the process can be withdrawn through line 43.

The residual slurry containing the nickel catalyst from the steam distillation unit 22 is taken off through line 25 and passed to line 26. Part of the pasting oil containing dissolved nickel carbonyl from line 31 may be diverted into line 26 and there admixed with the residual slurry in order to obtain a fluid consistency suitable for spraying into the gasification chamber. The gasification process has been previously described.

Variation and modification are possible within the scope of the specification, drawings and the appended claims to this invention, the essence of which is a method for decomposing nickel carbonyl in a reaction zone to form elemental nickel as a catalyst for the reaction and cooling the reaction products to reform nickel carbonyl and absorbing the reformed nickel carbonyl in the liquid hydrocarbon which comprises the fresh feed to the reaction zone.

I claim:

1. The process of converting a carbon-containing material into liquid hydrocarbons, boiling in the gasoline range, and a gas containing carbon monoxide and hydrogen which comprises passing a hydrocarbon pasting oil containing nickel carbonyl in admixture with hydrogen and a carbon-containing material into a hydrogenation zone; maintaining therein a hydrogenation reaction at a temperature sufficient to decompose nickel carbonyl to nickel and carbon monoxide and to hydrogenate at least a portion of said carbon containing material; separating and recovering liquid hydrocarbons, boiling in the gasoline range, as a product of the process; steam distilling a remaining heavy oil so as to obtain a pasting oil overhead product and a residuum, containing said nickel, as the bottoms product; passing said pasting oil into contact with a gaseous stream containing nickel carbonyl so as to dissolve nickel carbonyl in the pasting oil; admixing a portion of said pasting oil containing nickel carbonyl with said residuum; admixing said pasting oil and residuum with steam and oxygen; subjecting the resulting mixture to gasification reaction conditions of temperature and pressure so as to substantially convert the mixture into gaseous products containing substantial amounts of carbon monoxide and hydrogen, and to convert the nickel carbonyl into nickel and carbon monoxide; cooling said gaseous products so as to convert nickel and carbon monoxide into nickel carbonyl as a vapor; passing said gaseous product into contact with said pasting oil overhead product so as to remove nickel carbonyl from said gaseous product by dissolution in said pasting oil as hereinbefore set forth; recovering a portion of said gaseous product as a product of the process; passing the remaining portion of said gaseous product to a water gas shift reaction so as to produce a gas having a high hydrogen content; and passing said gas having a high hydrogen content to said hydrogenation zone.

2. The process of claim 1 wherein the amount of nickel carbonyl is maintained in the range 0.1 to 1 weight per cent based on the pasting oil; the hydrogenation reaction is maintained at a temperature in the range 750 to 1000° F., a pressure in the range 70 to 700 atmospheres, a contact time of 0.25 to 8 hours and a hydrogen content of 5 to 25 cubic feet per pound of charge stock; the gasification reaction is maintained at a temperature in the range 1400 to 3000° F., a pressure in the range 1 to 20 atmospheres, and with a contact time in the range 0.1 to 10 seconds; and the temperature to which the gaseous products of gasification are cooled is below 300° F.

3. The process of claim 1 wherein the amount of nickel carbonyl is maintained in the range of 0.1 to 0.5 weight per cent based on the pasting oil; the hydrogenation reaction is maintained at a temperature in the range 800 to 900° F., a pressure in the range 350 to 550 atmospheres, a contact time of 1 to 3 hours and a hydrogen content of 10 to 15 cubic feet per pound of charge stock; the gasification reaction is maintained at a temperature in the range 1800 to 2000° F., a pressure in the range 2 to 7 atmospheres and with a contact time in the range 1 to 5 seconds; and the temperature to which the gaseous products of gasification are cooled is in the range 200 to 300° F.

4. The process of claim 3 wherein the carbon-containing material is coal.

5. The process of claim 1 wherein the carbon-containing material is coal.

6. The process of claim 1 wherein the carbon-containing material is oil shale.

7. The process of claim 1 wherein the carbon-containing material is refinery residuum.

8. The process of converting a sulfur-containing carbonaceous material into liquid hydrocarbons, boiling in the gasoline range, and a gas containing hydrogen and carbon monoxide which comprises passing a hydrocarbon pasting oil, containing nickel carbonyl, in admixture with a sulfur-containing carbonaceous material and hydrogen into a hydrogenation zone; maintaining therein a hydrogenation reaction at a temperature sufficient to decompose said nickel carbonyl to nickel and carbon monoxide, to hydrogenate at least a portion of said carbonaceous material to hydrocarbons and to hydrogenate said sulfur to hydrogen sulfide; separating and removing hydrogen sulfide from the system; separating and recovering liquid hydrocarbons, boiling in the gasoline range, as a product of the process; steam distilling a remaining heavy oil so as to obtain a pasting oil overhead product and a residuum, containing said nickel, as the bottoms product; passing said pasting oil into contact with a gaseous stream containing nickel carbonyl so as to dissolve nickel carbonyl in the pasting oil; admixing a portion of said pasting oil containing nickel carbonyl with said residuum and with steam and oxygen; subjecting the resulting mixture to gasification reaction conditions of temperature and pressure so as to substantially convert the mixture into gaseous products containing substantial amounts of carbon monoxide and hydrogen, and to convert the nickel carbonyl into nickel and carbon monoxide; cooling said gaseous products so as to convert the nickel and carbon monoxide into nickel carbonyl as a vapor; passing said gaseous product into contact with said pasting oil overhead product so as to remove nickel carbonyl from said gaseous product by dissolution in said pasting oil as hereinbefore set forth; recovering a portion of said gaseous product as a product of the process; passing the remaining portion of said gaseous product to a water gas shift reaction so as to produce a gas having a high hydrogen content; and passing said gas having a high hydrogen content to said hydrogenation zone.

9. The process of claim 8 wherein the amount of nickel carbonyl is maintained in the range 0.1 to 1 weight per cent based on the pasting oil; the hydrogenation reaction is maintained at a temperature in the range 750 to 1000° F., a pressure in the range 70 to 700 atmopheres, a contact time of 0.25 to 8 hours and a hydrogen content of 5 to 25 cubic feet per pound of charge stock; the gasification reaction is maintained at a temperature in the range 1400 to 3000° F., a pressure in the range 1 to 20 atmospheres, and with a contact time in the range 0.1 to 10 seconds; and the temperature to which the gaseous products of gasification are cooled is below 300° F.

10. The process of claim 8 wherein the amount of nickel carbonyl is maintained in the range of 0.1 to 0.5 weight per cent based on the pasting oil; the hydrogenation reaction is maintained at a temperature in the range 800 to 900° F., a pressure in the range 350 to 550 atmospheres, a contact time of 1 to 3 hours and a hydrogen content of 10 to 15 cubic feet per pound of charge stock; the gasification reaction is maintained at a temperature in the range 1800 to 2000° F., a pressure in the range 2 to 7 atmospheres and with a contact time in the range 1 to 5 seconds; and the temperature to which the gaseous products of gasification are cooled is in the range 200 to 300° F.

11. The process of claim 10 wherein the carbon-containing material is coal.

12. The process of claim 8 wherein the carbon-containing material is coal.

13. The process of claim 8 wherein the carbon-containing material is oil shale.

14. The process of claim 8 wherein the carbon-containing material is refinery residuum.

15. In the conversion of a carbon-containing material into a gas containing carbon monoxide and hydrogen in the presence of a nickel catalyst, the method which comprises passing an admixture of nickel carbonyl, liquid hydrocarbon and a carbon-containing material into a combustion zone together with steam and oxygen, decomposing nickel carbonyl to elemental nickel and carbon monoxide by heat of combustion evolved, cooling products of said combustion sufficiently to reform nickel carbonyl, as a vapor, absorbing said nickel carbonyl from said combustion product gases in a liquid hydrocarbon and passing said liquid hydrocarbon containing said absorbed nickel carbonyl to said combustion zone.

16. The method of claim 15 wherein the amount of nickel carbonyl is maintained in the range 0.1 to 1.0 weight per cent based on the liquid hydrocarbon, the temperature in the combustion zone is maintained in the range 1400° to 3000° F., the pressure is maintained in the range 1 to 20 atmospheres, the contact time is maintained in the range 0.1 to 10 seconds, and the temperature to which the combustion products are cooled is below 300° F.

17. The method of claim 15 wherein the amount of nickel carbonyl is maintained in the range 0.1 to 0.5 weight per cent based on the liquid hydrocarbon, the temperature in the combustion zone is maintained in the range 1800° to 2000° F., the pressure is maintained in the range 2 to 7 atmospheres, the contact time is maintained in the range 1 to 5 seconds, and the temperature to which the combustion products are cooled is in the range 200° to 300° F.

References Cited in the file of this patent

UNITED STATES PATENTS

| | | |
|---|---|---|
| 1,138,201 | Ellis | May 4, 1915 |
| 1,251,202 | Ellis | Dec. 25, 1917 |
| 2,167,250 | Pferrmann | July 25, 1939 |
| 2,250,421 | Riblett | July 22, 1941 |
| 2,346,754 | Hemminger | Apr. 18, 1944 |
| 2,579,398 | Roetheli | Dec. 18, 1951 |
| 2,623,058 | Mattox | Dec. 23, 1952 |
| 2,636,841 | Mason | Apr. 28, 1953 |

OTHER REFERENCES

Mellor: "A Comprehensive Treatise on Inorganic and Theoretical Chemistry," vol. 5, page 953. London, Longmans, Green & Co., 1924.